(12) United States Patent
Straetz

(10) Patent No.: US 6,454,114 B2
(45) Date of Patent: Sep. 24, 2002

(54) PLASTIC FUEL TANK AND METHOD FOR PRODUCING SAME

(75) Inventor: Peter Straetz, Freiberg (DE)

(73) Assignee: DaimlerChrysler AG, Stuttgart (DE)

( * ) Notice: Subject to any disclaimer, the term of this patent is extended or adjusted under 35 U.S.C. 154(b) by 18 days.

(21) Appl. No.: 09/833,741

(22) Filed: Apr. 13, 2001

(30) Foreign Application Priority Data

Apr. 13, 2000 (DE) .......................................... 100 18 310

(51) Int. Cl.⁷ ............................................... B65D 11/00
(52) U.S. Cl. ...................... 220/4.14; 220/562; 220/4.21
(58) Field of Search ............................. 220/4.14, 562, 220/563, 4.21

(56) References Cited

U.S. PATENT DOCUMENTS

| | | | |
|---|---|---|---|
| 3,004,285 A | | 10/1961 | Hagen |
| 3,595,422 A | * | 7/1971 | Durrett, Jr. et al. ......... 220/4.14 |
| 5,129,544 A | | 7/1992 | Jacobson et al. |
| 5,221,021 A | * | 6/1993 | Danna ......................... 220/563 |
| 5,547,096 A | * | 8/1996 | Kleyn ..................... 220/562 X |
| 6,138,857 A | * | 10/2000 | Keller ..................... 220/562 X |
| 6,138,859 A | * | 10/2000 | Aulph et al. ................. 220/563 |
| 6,409,040 B1 | * | 6/2002 | Distelhoff et al. ...... 220/4.14 X |

FOREIGN PATENT DOCUMENTS

| | | |
|---|---|---|
| EP | 0419068 | 3/1991 |
| JP | 58202112 | 11/1983 |
| JP | 62099134 | 5/1987 |
| WO | WO 97/03511 | 1/1997 |

OTHER PUBLICATIONS

Copy of Search Report.

* cited by examiner

Primary Examiner—Steven Pollard
(74) Attorney, Agent, or Firm—Crowell & Moring LLP

(57) ABSTRACT

In order to provide a cost-effective plastic fuel tank and a method for producing same, which can be carried out in a simple way, the plastic tank is produced from two halves which are to be connected to one another. The halves emanate from a plastic casing produced by a blowing method and are severed along a line provided for this purpose.

18 Claims, 1 Drawing Sheet

PLASTIC FUEL TANK AND METHOD FOR PRODUCING SAME

BACKGROUND OF THE INVENTION

This application claims the priority of German application 100 18 3107, filed Apr. 13, 2000, the disclosure of which is expressly incorporated by reference herein.

The present invention relates to a plastic fuel tank and to a method for producing the fuel tank.

The plastic fuel tanks used in motor vehicles are presently produced by the blowing method. This method is cost-effective, and materials can be used which provide properties necessary for fuel tanks (high impact strength, low permeability). With fuel tanks produced by the blowing method, however, the mounting of fittings necessary for the fuel tank presents difficulties, because these fittings have to be introduced through a mounting orifice.

To solve this problem, WO 97/03511 proposed to produce the fuel tank by welding together an upper plastic shell having the upper terminating wall and a lower plastic shell forming the bottom. The two plastic shells were produced by the injection-molding method. One disadvantage of these known fuel tanks, however, is that the materials normally used for injection molding do not meet impact strength requirements. Furthermore, gases and vapors may escape through tank walls made from known injection-molding materials. In addition, because of the high pressures occurring during injection molding, the molds for this method have to be made very robust and are therefore very costly.

SUMMARY OF THE INVENTION

An object of the present invention is to provide a cost effective plastic fuel tank and a method for producing same. In particular, the method is to be simple to carry out, and the tank according to the invention is to satisfy the requirements as to impact strength and permeability to gases and vapours.

This object has been achieved by providing a plastic fuel tank which consists of two halves which are initially produced in one piece by the blowing method. The two halves are produced in one work step and in one mold. By the blowing method, a plastic casing forming a cavity is produced, which is subsequently severed at points provided for this purpose, for example on its circumference. After the plastic casing has been severed, the necessary recesses can be made and/or fittings, such as electrical connections, a filling orifice, filters, etc., can be installed in the halves without any appreciable outlay and the halves can thereafter be connected to one another again.

The advantage of the fuel tank according to the present invention is that the two halves are produced in one work step and one mold. This has a positive effect, namely a lowering of the production costs and of production time. Moreover, the fittings can be installed in the fuel tank in a simple way, because the two halves, in particular also their sides which face the interior after assembly, are accessible from all sides and installation does not have to take place only through a limited orifice.

Furthermore, by way of the blowing method, plastics can be processed which meet the requirements both as to impact strength and as to barrier properties with respect to gases and vapors. This is possible, in particular, in conjunction with coating methods, such as, for example, fluorination, or with multi-layer plastics which, for example by the coextrusion blowing method, can be shaped into a casing which forms a cavity. By a plurality of layers of plastics being used, the positive properties of different plastics can be combined. The tank wall may thereby be given properties which either cannot be achieved with one raw material alone or, if only one plastic suitable per se were used, would entail excessively high material costs.

The desired property combination of impact strength and barrier properties with respect to gases and vapors can be achieved by a carrier material being selected which has high impact strength, for example a polyethylene with high density (high-density polyethylene—HDPE). A barrier layer, for example composed of polyamide, may then be introduced between this carrier material. The barrier properties of the tank wall can thereby be increased, without the impact strength of the carrier material having to be dispensed with.

Because the barrier layer often consists of a material of a different kind from the carrier material, an adhesion promoter layer is arranged between the carrier material and the barrier layer, so that a tank wall constructed in this way has, for example, the following appearance: carrier material—adhesion promoter—barrier layer—adhesion promoter—carrier material. The coextrusion blowing method per se is known, so that there is no need here for further detail regarding that method.

The above objects are also achieved by a method in which a tank casing is first produced by the blowing method. The casing is thereafter severed along a line provided for this purpose, for example along its circumference. Fittings can be integrated in a simple way into the separated casing halves then present, because all the regions of the halves are freely accessible. The two halves are subsequently laid one onto the other, specifically in such a way that they enclose a cavity, and are connected to one another again.

In a currently preferred embodiment of the method according to the present invention, the casing produced by the blowing method has a U-shaped protuberance along its circumference. To sever the two casing halves, then, at least part of the protuberance is detached, specifically, perpendicularly to the extent of the protuberance. This results, at the outer edge of the two casing halves, in each case in outwardly directed flanges. Via the flanges, the halves are connected to one another after fittings have been incorporated. Connection may take place, for example, by welding or adhesive bonding.

It also is contemplated however, not to cause the protuberance to run along the circumference, but along another line on the casing. The present invention further contemplates providing the protuberance in another suitable form which makes it possible to connect the two casing halves to one another in a simple way along the severing line after the at least partial detachment of the protuberance and incorporation of fittings.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

The fuel tank according to the present invention consists of two halves which emanate from a single casing 1 (FIG.

1) produced by the blowing method. The casing 1 consists preferably of multi-layer plastic, in which at least one layer consists of HDPE and at least one further layer takes the form of a barrier layer. In this way, the impact strength requirements of fuel tanks, particularly when used in the motor vehicle sector, are satisfied, and the escape of gases and vapors through the tank wall can be as far as possible avoided. The casing 1 may however, also have only an HDPE layer with a permeation-inhibiting coating which is achieved, for example, by fluorination.

Figure 1:
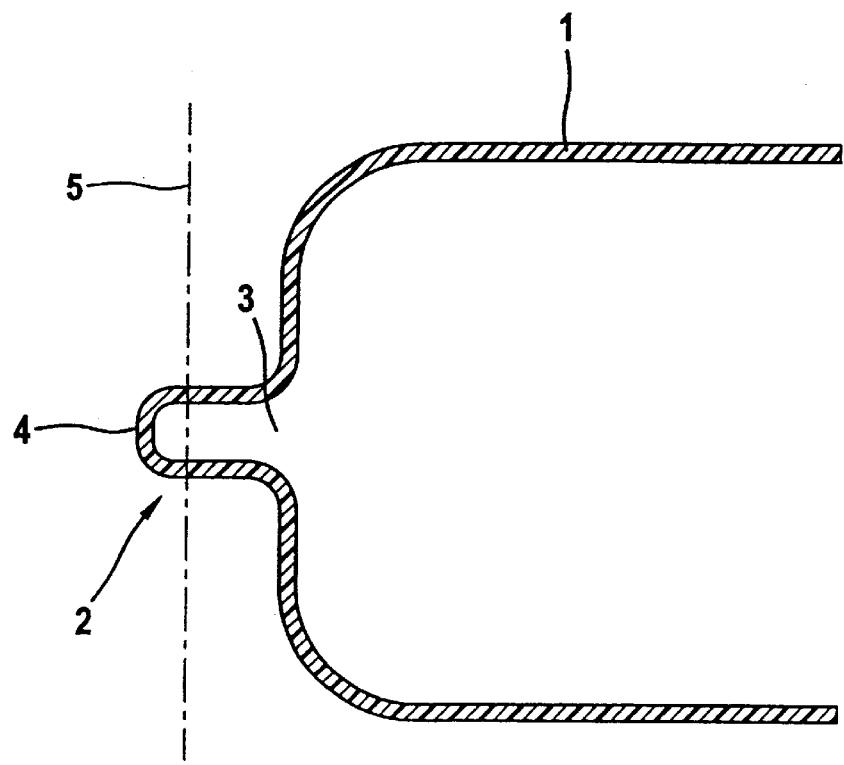
FIG. 1 is a sectional view through a casing produced by the blowing method, with a U-shaped protuberance.

As illustrated in FIG. 1, to produce a fuel tank according to the invention, the casing 1 has along its circumference a protuberance 2 having a U-shaped cross section. The open side 3 of the protuberance 2 points in the direction of the inside of the casing and the closed side 4 thereof points in the direction of the outside of the casing.

In the method used to produce the fuel tank according to the present invention, the U-shaped protuberance 2 is at least partially detached, specifically along the line 5, as illustrated in FIG. 1. The detached part comprises at least the curved part of the closed side 4, so that the undetached parts remaining on the halves 6a, 6b are essentially straight. Because the protuberance 2 extends along the circumference of the casing 1, two casing halves 6a, 6b are obtained due to at least part of the protuberance 2 being detached. Due to the special shape of the protuberance, after at least part of the protuberances have been detached, these two halves 6a, 6b are equipped in each case along their terminating edge with an outwardly directed flange 7a, 7b.

Figure 2:
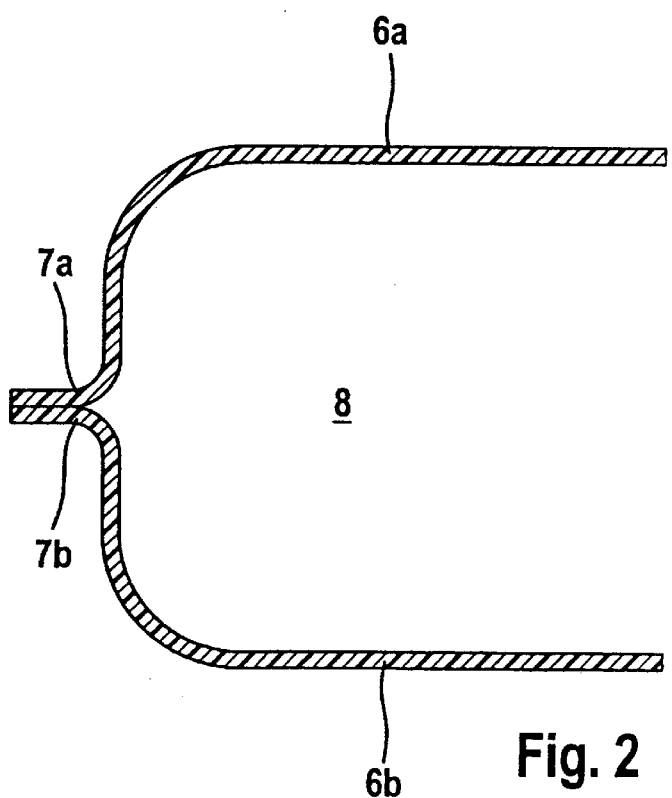
FIG. 2 is a sectional view through a tank casing according to the present invention.

Necessary recesses can then be made and additional fittings attached or installed in the halves 6a, 6b, because all the regions of the casing are easily accessible. The fittings may, for example, be welded to the tank halves 6a, 6b. After the fittings have been introduced, the halves 6a, 6b are laid one onto the other again, specifically in such a way that a cavity 8 for receiving fuel is obtained between them (see, for example, FIG. 2). Inasmuch the undetached parts of the protuberance 2, which form the flanges 7a, 7b, are essentially straight, the two halves 6a, 6b can be laid one onto the other such that the flanges 7a, 7b come to rest on one another. In the sectional illustration according to FIG. 2, the flanges 7a, 7b extend parallel. The contact surface formed by the flanges 7a, 7b between the halves 6a, 6b after the latter have been laid one onto the other is highly suited to the leak-tight connection, for example welding, of the halves 6a, 6b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Plastic fuel tank consisting of two halves connected to one another, wherein the two halves emanate from a one-piece plastic casing produceable by a blowing method and first severed along a predetermined line and is subsequently rejoined to form a one-piece tank.

2. Fuel tank according to claim 1, wherein the two halves consist of single-layer plastic.

3. Fuel tank according to claim 1, wherein the two halves have a permeation-inhibiting coating.

4. Fuel tank according to claim 3, wherein the two halves consist of single-layer plastic.

5. Fuel tank according to claim 4, wherein at least one layer of the multi-layer plastic is of HDPE.

6. Fuel tank according to claim 4, wherein at least one layer of the multi-layer plastic is of a barrier layer.

7. Fuel tank according to claim 6, wherein at least one layer of the multi-layer plastic is of HDPE.

8. Fuel tank according to claim 1, wherein the two halves consist of multi-layer plastic.

9. Fuel tank according to claim 1, wherein the two halves are welded to one another.

10. Fuel tank according to claim 1, wherein the two halves are configured so as to have fittings installable therein or attachable thereto before the two halves have been connected.

11. Method for producing a plastic fuel tank according to claim 1, comprising:

(a) producing a casing by a blowing method, (b) severing the casing along a predetermined line, (c) carrying out fittings on casing halves obtained by the severing, (d) laying the casing halves one onto the other, and (e) reconnecting the casing halves to one another.

12. Method according to claim 11, wherein the blowing method is extrusion blowing.

13. Method according to claim 11, wherein the casing has a protuberance along the predetermined severing line.

14. Method according to claim 13, wherein the protuberance runs along a circumference of the casing.

15. Method according to claim 13, wherein the protuberance has a U-shape.

16. Method according to claim 13, wherein the severing of the casing at lest partially detaches the protuberance.

17. Method according to claim 11, wherein fittings are weldable to the casing halves.

18. Method according to claim 11, wherein the connecting of the two halves is effected by a welded connection.

* * * * *